Oct. 23, 1962

A. J. GRANBERG 3,059,473

POSITIVE DISPLACEMENT TYPE LIQUID METER ASSEMBLY

Filed Dec. 23, 1959

INVENTOR.
ALBERT J. GRANBERG
BY
Bruce & Brosler
HIS ATTORNEYS

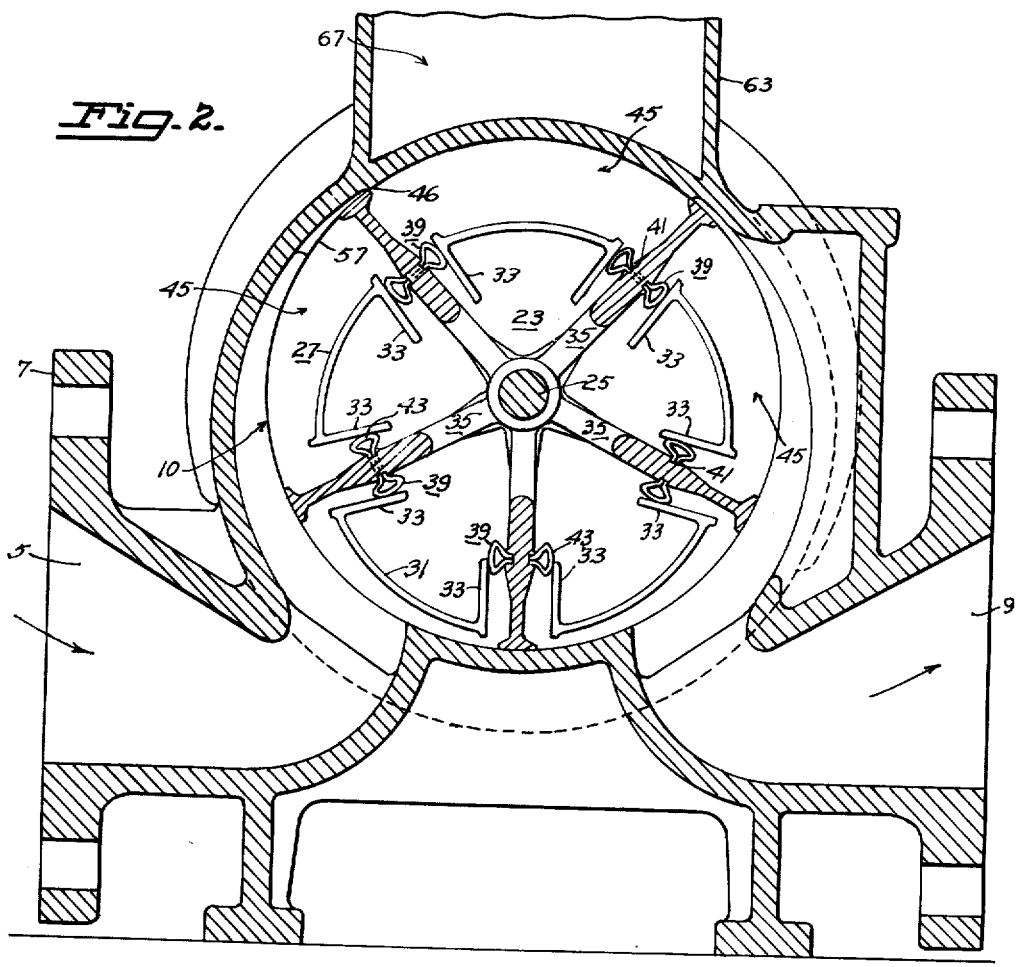
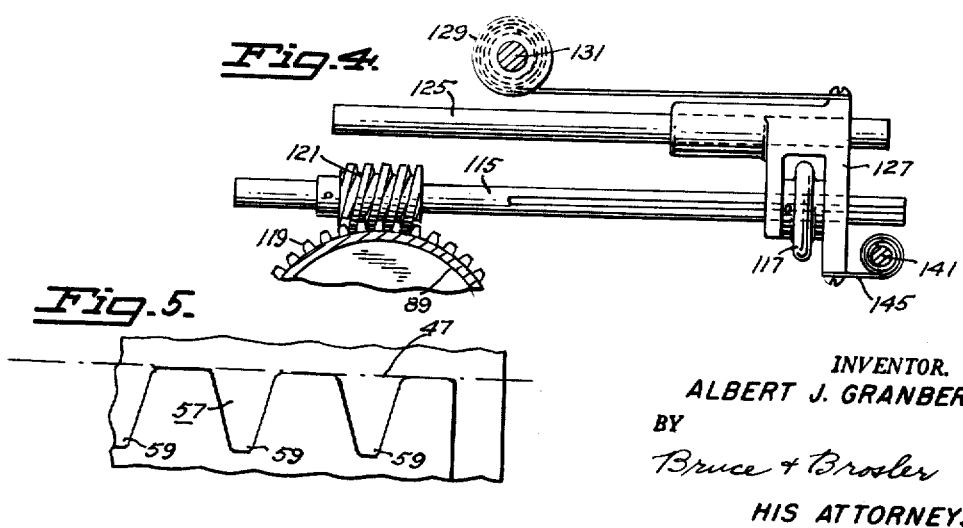

United States Patent Office 3,059,473
Patented Oct. 23, 1962

3,059,473
POSITIVE DISPLACEMENT TYPE LIQUID METER ASSEMBLY
Albert J. Granberg, Oakland, Calif., assignor to Granberg Corporation, Oakland, Calif., a corporation of California
Filed Dec. 23, 1959, Ser. No. 861,644
8 Claims. (Cl. 73—259)

My invention relates to liquid meters and more particularly to liquid meters of the positive displacement type.

Among the objects of my invention are:

(1) To provide a novel and improved liquid meter assembly of the positive displacement type;

(2) To provide a novel and improved liquid meter assembly of the positive displacement type in which the operation is smooth and shockless;

(3) To provide a novel and improved liquid meter assembly of the positive displacement type which may be conveniently adjusted for accuracy;

(4) To provide a novel and improved liquid meter assembly of the positive displacement type in which wear has been minimized; and (5) To provide a novel and improved blade for a meter of the positive displacement type.

Additional objects of my invention will be brought out in the following description of a preferred embodiment of the same taken in conjunction with the accompanying drawings wherein:

FIG. 2 is a transverse view in section taken in the plane 2—2 of FIG. 1;

FIG. 4 is a view taken in the plane 4—4 of FIG. 1;

FIG. 5 is a view depicting a feature of construction in the meter of FIG. 1.

Figure 1:
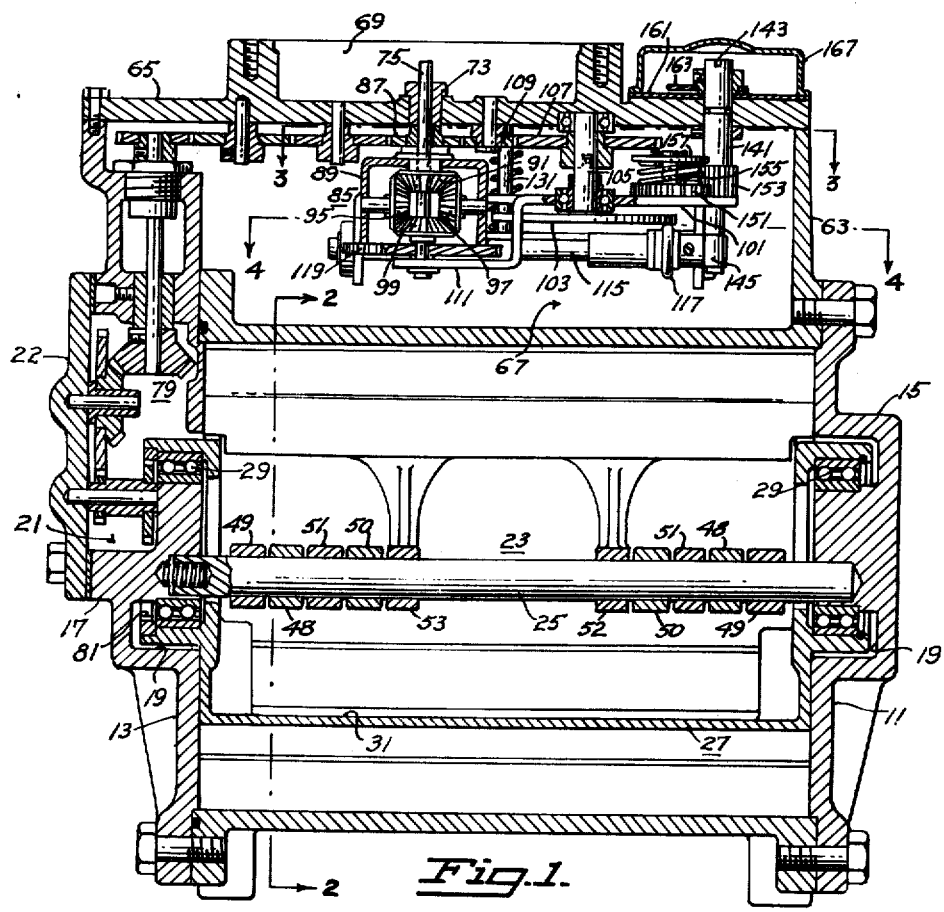
FIG. 1 is a longitudinal view in section of a liquid meter of the present invention.
Figure 3:
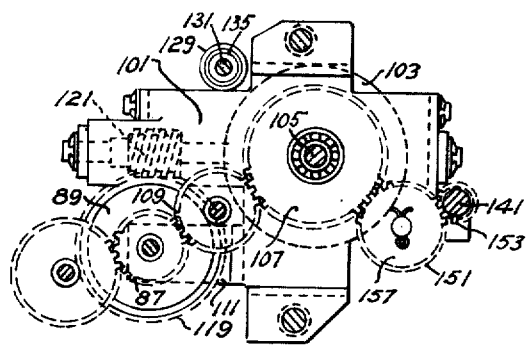
FIG. 3 is a plan view taken in the plane 3—3 of FIG. 1.
Figure 6:
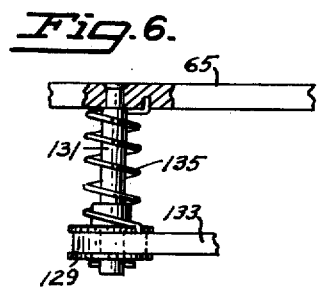
FIG. 6 is a view depicting an additional feature of construction in the meter of FIG. 1.

Referring to the drawings for details of my invention in its preferred form, the meter assembly includes a casing having an input passage 5 surrounded by a mounting flange 7 and terminating in an input opening 10 to the meter, a discharge passage 9 and end walls 11, 13, the interior surface of the casing between the end walls being cylindrical to define a cylindrical chamber.

Each of the end walls 11 and 13 are preferably provided with an external boss 15 and 17 respectively. Interiorly of the casing and within the area covered by each boss, each end wall is provided with a circular bearing recess 19 of a diameter sufficient to encompass the axis of the cylindrical chamber. One of the bosses 17 externally of the casing is formed with a recess 21 disposed in offset relationship to the bearing recess and of sufficient depth to intercept a portion of said bearing recess and expose the same. This recess is closed by a cover plate 22.

Within the casing and more particularly in the cylindrical chamber, the casing houses a rotor assembly 23 which includes a fixed shaft 25 extending between and supported by the end walls axially of the cylindrical chamber 27, a rotor cage 27 wihch is asymmetrically disposed in said chamber and rotatably mounted therein at its ends, in the aforementioned bearing recesses 19 provided therefor in the end walls. Bearings 29 in such recesses support the ends of the rotor cage to provide for a minimum of friction at such locations.

The rotor cage comprises a cylindrical shell 31 provided with a plurality of equally spaced radial slots running longitudinally thereof and defined by pairs of spaced parallel inwardly directed flanges 33. A plurality of blades 35 corresponding in number to the number of longitudinal slots in the rotor cage, are each provided at one end with bearings for rotatably mounting the same on the fixed shaft, while at an intermediate point in spaced relationship to the edge of the blade and between the proximate flanges 33, each blade includes a longitudinal bearing means slidably riding in its associated slot whereby the blade may reciprocate substantially in a radial direction and simultaneously oscillate, both with a minimum of friction during the rotation of the rotor assembly in response to the flow of liquid through the meter chamber.

The bearing means for each blade constitutes a pair of inserts 39 of preferably stainless steel, one for each side of the blade, with each insert having a longitudinal edge 41 enabling the insert to be cast into the blade, at the time the blade is cast, which in the interest of lightness should be of aluminium, while the flange engaging portion 43 of each insert is of substantially arcuate contour to accommodate the combined sliding and oscillating movements of the blade between its associated flanges during operation of the meter.

At its free edge, each blade terminates in close proximity to or in sliding contact with the cylindrical surface of the chamber to form with the cylindrical shell 31 a series of pockets or chambers 45.

Liquid flowing through the intake passage 5, fills the exposed pockets as the blades are driven in rotation. When the trailing blade of such a pocket reaches the land 46 at the leading edge of the opening 10 into the meter chamber, the blade cuts off further intake and traps the liquid therein. The line 47 along which such cut-off occurs, may be designated the cut-off line.

Inasmuch as the blades 35 rotate on the axis of the cylindrical chamber, while the shell 31 rotates on an axis which is asymmetrically disposed with respect thereto, the pockets 45 will diminish in size between the intake and discharge passages, whereby liquid trapped within the pockets at the intake side of the meter, will for the most part be squeezed out therefrom into the discharge passage of the meter as the pockets move across said passage.

In the preferred form of the present invention, the blades are five in number as described in my co-pending application for Air Separator-Liquid Meter Assembly, Serial No. 684,103, filed September 16, 1957, because I have found that, with this number of blades, there is no dead center position in which the blades may come to rest, and thus effective starting of the meter is assured at all times. Furthermore, with the five blades as indicated, oscillatory movement of the blades is reduced and the blades will maintain a maximum drive throughout the operation of the meter, while only one blade may close at any time, thereby reducing shock.

Also, in utilizing a five blade rotor, the blades may be so designed as to permit of a certain amount of interchangeability, for by constructing two of the blades with shaft mounting bearings 48, 49 spaced apart almost the length of the fixed shaft, the blades may be installed one reversed with respect to the other.

Similarly, a second pair of blades, constructed with bearings 50, 51 spaced apart almost the width of the space between the bearings of the first pair, may be installed in like manner, that is with one reversed with respect to the other. The fifth blade will be formed with bearings 52, 53 spaced sufficiently to fit within the remaining space on the shaft. Thus with the five blades, only three blade patterns are required, and to this extent, the five blade rotor, aside from the other advantages noted, permits of a certain amount of standardization, which in turn effects economies in manufacture of the meter.

In a meter of the above type, the sudden closing or sealing of a pocket or chamber as each blade reaches the line of cut-off, introduces a shock in the operation of the meter. Such shock is reduced considerably in the present invention by providing means which changes the sudden contact between the edge of the blade and the cylindrical surface of the meter chamber, to one of gradually increasing contact until the blade reaches the designated cut-off line.

This is accomplished in the intake passage by providing a continuously increasing surface contact approach to the cut-off line, in the form of a sawtooth approach surface 57 following in the curvature of the cylindrical wall of the meter chamber. Thus, as each blade approaches the sawtooth approach surface to the cut-off line, it first engages the peaks 59 of the sawtooth and gradually increases its surface line contact until the cut-off line 47 is reached, at which instant, the blade effects contact along its entire edge and thus closes or seals the pocket. During this period of approach, it will be appreciated, that the exposed flow passage into the pocket has been gradually reduced from maximum to zero and in substantial inverse ratio.

The meter casing is provided with an upwardly extending substantial rectangular wall 63 adapted to receive a cover plate 65 to form a chamber 67 above the rotor assembly chamber. This cover is formed with a circular mounting rib 69 on the upper side thereof for supporting a counter or other registering mechanism (not shown).

The cover plate 65 is provided with a bushing 73 through which passes a meter shaft 75, which couples to the counter or other registering mechanism. A gear drive connection 79 to the meter shaft 75 from the rotor assembly 23 includes a ring gear 81 mounted in the exposed end of the rotor cage and connecting through a series of gears to a differential gear assembly 85, the gear 87 immediately preceding the differential gear assembly being rotatably mounted on the meter shaft.

The differential gear assembly involves a gear housing 89 having a cylindrical side wall and end walls, a bevel sun gear 91 rotatably mounted within said housing on an end wall in alignment with and coupled to the aforementioned last gear 87, and having a shaft passage therethrough for the meter shaft, bevel planetary gears 95, 97 rotatably mounted at diametrically opposite positions on the housing side wall and in mesh with the gun gear 91, and a second sun gear 99 rotatably mounted on the opposite end wall in mesh with the planetary gears. The meter shaft extends downwardly through the second sun gear 99 which is fixed thereto.

The aforementioned gear drive 79 constitutes a positive drive connection from the rotor cage 31 to the meter shaft 75, but the inclusion of the differential gear assembly 85 in such drive connection, makes it possible to adjust the speed ratio between the rotor assembly and the meter shaft, while maintaining the positive drive connection between the two. This is accomplished by imparting a rotational movement to the gear housing 89 in one direction or the other, depending on whether one desires to add or detract from the existing speed ratio, and the present invention contemplates including in the meter, means for effecting such adjustments in order to adjust the meter for accuracy.

Toward this end, I provide a platform 101 from which is rotatably suspended a horizontal disk 103, by means of a shaft 105 journalled in the platform and extending upwardly to the cover 65 in which the end of the shaft is journalled. Such shaft carries a gear 107 in drive connection from the gear 87 through an idler gear 109. The horizontal disk 103 thus will be maintained in rotation so long as the meter is functioning.

The platform is provided with an offset 111 extending beneath the differential gear assembly, to provide a bearing for the lower end of the meter shaft 75 and a support for the differential gear assembly as a whole.

Below the disk 103 and substantially in a diametrical plane, is a rotatably mounted shaft 115 carrying a friction wheel 117 which is slidably keyed to the shaft, with its periphery frictionally engaging the proximate surface of the disk 103.

To the lower end wall of the differential gear housing 89 is a gear 119 which is engaged by a worm 121 mounted on and affixed to the proximate end of the rotatable shaft 115. Thus, rotation of the friction wheel by reason of its friction contact with the rotating disk 103 will result in rotational movement being imparted to the differential gear housing, in a direction depending on whether the friction wheel 117 be to the left or right of the center of the disk 103, and at a rate depending on the radial distance of the friction wheel from such center.

The location of the friction wheel on the shaft, is manually adjustable. This is accomplished by providing a parallel shaft 125 on which is slidably mounted a yoke 127 in straddling relationship to the friction wheel 117 whereby the friction wheel may be adjusted along its shaft, by controlled movement of the yoke on the parallel shaft.

The yoke is normally biased in one direction along its shaft by a spring reel 129 suspended from the cover plate 65 by a shaft 131 to locate the reel adjacent one end of the intended range of movement of the yoke. The reel tape 133 is connected to such yoke at a convenient point thereof, and is normally tensioned by a wound spring 135 surrounding the shaft 131, with one end anchored in the cover plate and its other end in the reel.

Located in proximity to the opposite end of the intended range of movement of the yoke, and supported by the cover plate, is a shaft 141 having means preferably in the form of a screwdriver slot 143 in its exposed end, to enable manual rotation thereof. At its lower extremity, this shaft has wound thereon, a length of tape 145 preferably of flexible metal, the exposed end of which is anchored to a convenient point on the yoke 127. Thus manual rotation of the shaft in the direction of winding up the tape, will force movement of the yoke in direction of the shaft against the action of the reel spring 135 while rotation of the shaft in the opposite direction, permitting unwinding of the tape from the end thereof, will enable the spring reel to take over and cause movement of the yoke in the opposite direction.

Braking action, essential toward maintaining a selected adjustment, is provided and may take the form of a gear 151 coupled to a pinion 153 on the adjusting shaft 141 and maintained in side frictional contact with the platform 101 by the pressure of a spring 155 disposed between such gear and a washer 157 mounted on the gear shaft above the gear.

A suitable scale 161 disposed on the cover plate about the adjusting shaft 141, and a pointer 163 on the shaft, may be utilized in conjunction with the scale to set the calibration of the particular meter, following which, tampering therewith may be discouraged by a cap 167 disposed over the adjusting shaft and scale and sealed or otherwise fixed to the cover of the meter.

From the foregoing description of my invention in its preferred form, it will be apparent that the same fulfills all the objects attributable thereto, and while I have disclosed my invention in considerable detail, the same is subject to alteration and modification without departing from the underlying principles involved, and I accordingly do not desire to be limited in my protection to the specific details illustrated and described, except as may be necessitated by the appended claims.

I claim:

1. An adjustable liquid meter comprising a meter housing; a rotor assembly in said housing; a shaft adapted for connection to a counter or the like; drive means between said rotor assembly and said shaft for converting rotation of said rotor assembly into rotation of said shaft, said drive means including a differential gear assembly involving a gear housing having end and side walls, a bevel sun gear rotatably mounted on an end wall in said housing and having a shaft passage longitudinally thereof, bevel planetary gears rotatably mounted at opposite positions on said housing wall and in mesh with said sun gear, a second bevel sun gear rotatably mounted on the opposite end wall in mesh with said planetary gears, said shaft rotatably extending down through said first sun gear to said second sun gear and said second sun gear being mounted on and affixed to said shaft; means enabling adjusting the speed ratio of said drive means between said rotor assembly and said shaft, said speed ratio adjusting means comprising a rotatably mounted disk in drive connection with said drive means, a rotatable friction wheel shaft below said disk and parallel to a diameter thereof, a friction wheel slidably keyed on said shaft in frictional contact with said disk, a worm gear adjacent an end of said shaft, and a gear affixed to an end wall of said gear housing in mesh with said worm gear; and means for manually shifting said friction wheel along its shaft to effect an adjustment of said speed ratio, said manual shifting means including a yoke straddling said friction wheel and capable of movement along said friction wheel shaft, spring means connected to said yoke and urging the same in one direction along said frictional wheel shaft, said spring means comprising a spring reel to one side of said yoke and having an extensible tape anchored at its exposed end to said yoke, an adjusting shaft extending through and journalled in a wall of said meter housing and terminating at a point to the other side of said yoke, a tape wound on said shaft and having its exposed end anchored to said yoke, and means for manually rotating said adjusting shaft; and brake means for holding said yoke in any of its adjustable positions, said brake means including a spring pressured gear in contact with a fixed surface within said meter, and a pinion on said adjusting shaft in mesh with said spring pressured gear; and means associated with the external end of said adjusting shaft for indicating adjustments.

2. An adjustable liquid meter comprising a meter housing; a rotor assembly in said housing; a shaft adapted for connection to a counter or the like; drive means between said rotor assembly and said shaft for converting rotation of said rotor assembly into rotation of said shaft, said drive means including a differential gear assembly involving a gear housing; means enabling adjusting the speed ratio of said drive means between said rotor assembly and said shaft, said speed ratio adjusting means comprising a rotatably mounted disk in drive connection with said drive means, a rotatable friction wheel shaft below said disk and parallel to a diameter thereof, a friction wheel slidably keyed on said shaft in frictional contact with said disk, a worm gear adjacent an end of said shaft, and a gear affixed to said gear housing in mesh with said worm gear; and means for manually shifting said friction wheel along its shaft to effect an adjustment of said speed ratio, said manual shifting means including a yoke straddling said friction wheel and capable of movement along said friction wheel shaft, spring means connected to said yoke and urging the same in one direction along said frictional wheel shaft, said spring means comprising a spring reel to one side of said yoke and having an extensible tape anchored at its exposed end to said yoke, an adjusting shaft extending through and journalled in a wall of said meter housing and terminating at a point to the other side of said yoke, a tape wound on said shaft and having its exposed end anchored to said yoke, and means for manually rotating said adjusting shaft, and brake means for holding said yoke in any of its adjustable positions, said brake means including a spring pressured gear in contact with a fixed surface within said meter, and a pinion on said adjusting shaft in mesh with said spring pressured gear.

3. An adjustable liquid meter comprising a meter housing; a rotor assembly in said housing; a shaft adapted for connection to a counter or the like; drive means between said rotor assembly and said shaft for converting rotation of said rotor assembly into rotation of said shaft, said drive means including a differential gear assembly involving a gear housing; means enabling adjusting the speed ratio of said drive means between said rotor assembly and said shaft, said speed ratio adjusting means comprising a rotatably mounted disk in drive connection with said drive means, a rotatable friction wheel shaft in proximity to said disk and parallel to a diameter thereof, a friction wheel slidably mounted on said shaft in frictional contact with said disk, a worm gear adjacent an end of said shaft, and a gear affixed to said gear housing in mesh with said worm gear; and means for manually shifting said friction wheel along its shaft to effect an adjustment of said speed ratio, said manual shifting means including a yoke straddling said friction wheel and capable of movement along said friction wheel shaft, spring means connected to said yoke and urging the same in one direction along said frictional wheel shaft, said spring means comprising a spring reel to one side of said yoke and having an extensible tape anchored at its exposed end to said yoke, an adjusting shaft extending through and journalled in a wall of said meter housing and terminating at a point to the other side of said yoke, a tape wound on said shaft and having its exposed end anchored to said yoke, and means for manually rotating said adjusting shaft; and brake means for holding said yoke in any of its adjustable positions, said brake means including a spring pressured gear in contact with a fixed surface within said meter, and a pinion on said adjusting shaft in mesh with said spring pressured gear; and means associated with the external end of said adjusting shaft for indicating adjustments.

4. A meter including a casing having a cylindrical wall terminating in opposing end walls to define a meter chamber, an inlet passage terminating in an opening to said chamber, and an outlet passage from said chamber; a rotor assembly including a cylindrical rotor cage having a plurality of equally spaced slots and a blade assembly including a shaft, a plurality of blades of a radial length substantially equal to the radius of said meter chamber and rotatably mounted about said shaft with each blade slidably passing through one of said cage slots, said rotor assembly being disposed in said meter chamber with said blade shaft on the longitudinal axis of the chamber and said cage mounted for rotation asymmetrically with respect to said blade assembly; and means in said inlet passage adjacent the advance edge of its opening into the meter chamber for easing each blade to its cut-off position as it passes across said passage, said means including a substantially saw tooth surface with surface line contact with each blade gradually increasing with approach to the cut-off line defining said cut-off position.

5. A meter including a casing having a cylindrical wall terminating in opposing end walls to define a meter chamber, an inlet passage terminating in an opening to said chamber, and an outlet passage from said chamber; a rotor assembly including a cylindrical rotor cage having a plurality of equally spaced slots and a blade assembly including a shaft, a plurality of blades of a radial length substantially equal to the radius of said meter chamber and rotatably mounted about said shaft with each blade slidably passing through one of said cage slots, said rotor assembly being disposed in said meter chamber with said blade shaft on the longitudinal axis of the chamber and said cage mounted for rotation asymmetrically with respect to said blade assembly; and means in said inlet passage adjacent the advance edge of its opening into the meter chamber for easing each blade to its cut-off position as it passes across said passage, said means including a substantially saw tooth surface with surface line contact with each blade gradually increasing with approach to the cut-off line defining said cut-off position, with said saw-tooth surface following in the curvature of the cylindrical wall of said chamber.

6. A meter including a casing having a cylindrical wall terminating in opposing end walls to define a meter chamber, an inlet passage terminating in an opening to said chamber, and an outlet passage from said chamber, a rotor assembly including a cylindrical rotor cage having a plurality of equally spaced slots and a blade assembly including a shaft, a plurality of blades of a radial length substantially equal to the radius of said meter chamber and rotatably mounted about said shaft with each blade slidably passing through one of said cage slots, said rotor assembly being disposed in said meter chamber with said blade shaft on the longitudinal axis of the chamber and said cage mounted for rotation asymmetrically with respect to said blade assembly, each blade being of substantial axial length compared to thickness, said blade being of cast material and having opposed longitudinal slide bearings running substantially the axial length of said blade, each along a side thereof and cast therein in spaced relationship to a free edge of said blade, each of said bearings being formed with an exposed arcuate surface.

7. A meter including a casing having a cylindrical wall terminating in opposing end walls to define a meter chamber, an inlet passage terminating in an opening to said chamber, and an outlet passage from said chamber, a rotor assembly including a cylindrical rotor cage having a plurality of equally spaced slots and a blade assembly including a shaft, a plurality of blades of a radial length substantially equal to the radius of said meter chamber and rotatably mounted about said shaft with each blade slidably passing through one of said cage slots, said rotor assembly being disposed in said meter chamber with said blade shaft on the longitudinal axis of the chamber and said cage mounted for rotation asymmetrically with respect to said blade assembly, each blade being of substantial axial length compared to thickness, said blade being of cast metal and having opposed longitudinal slide bearings running substantially the axial length of said blade, each along a side thereof and cast therein in spaced relationship to a free edge of said blade, each of said bearings being of stainless steel and formed with an exposed arcuate surface.

8. A meter including a casing having a cylindrical wall terminating in opposing end walls to define a meter chamber, an inlet passage terminating in an opening to said chamber, and an outlet passage from said chamber, a rotor assembly including a cylindrical rotor cage having a plurality of equally spaced slots and a blade assembly including a shaft, a plurality of blades of a radial length substantially equal to the radius of said meter chamber and rotatably mounted about said shaft with each blade slidably passing through one of said cage slots, said rotor assembly being disposed in said meter chamber with said blade shaft on the longitudinal axis of the chamber and said cage mounted for rotation asymmetrically with respect to said blade assembly, each blade being of substantial axial length compared to thickness, said blade being of cast aluminum and having opposed longitudinal slide bearings running substantially the axial length of said blade, each along a side thereof and cast therein in spaced relationship to a free edge of said blade, each of said bearings being of stainless steel and formed with an exposed arcuate surface.

References Cited in the file of this patent

UNITED STATES PATENTS

| | | |
|---|---|---|
| 1,901,348 | Kapuczin | Mar. 14, 1933 |
| 2,017,825 | Woodford | Oct. 15, 1935 |
| 2,202,122 | Siebert et al. | May 28, 1940 |
| 2,791,118 | Holtz | May 7, 1957 |
| 2,845,048 | Fraser | July 29, 1958 |

FOREIGN PATENTS

| | | |
|---|---|---|
| 746,484 | Germany | Aug. 8, 1944 |
| 681,222 | Great Britain | Oct. 22, 1952 |

OTHER REFERENCES

I.S.A. Journal, vol. 8, September 1952, pp. 115–119. (Copy in Div. 36 73—88.)